US011777920B2

(12) United States Patent
Hori

(10) Patent No.: US 11,777,920 B2
(45) Date of Patent: Oct. 3, 2023

(54) AUTHENTICATION SYSTEM FOR PREVENTING REPLICATION OF AUTHENTICATION TARGET APPARATUS AUTHENTICATED BY AUTHENTICATION APPARATUS

(71) Applicant: Canon Kabushiki Kaisha, Tokyo (JP)

(72) Inventor: Kenjiro Hori, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 177 days.

(21) Appl. No.: 17/192,071

(22) Filed: Mar. 4, 2021

(65) Prior Publication Data

US 2021/0281556 A1 Sep. 9, 2021

(30) Foreign Application Priority Data

Mar. 5, 2020 (JP) ................................ 2020-038119

(51) Int. Cl.
*H04L 29/06* (2006.01)
*H04L 9/40* (2022.01)
*H04L 9/06* (2006.01)

(52) U.S. Cl.
CPC .......... *H04L 63/083* (2013.01); *H04L 9/0618* (2013.01); *H04L 9/0643* (2013.01)

(58) Field of Classification Search
None
See application file for complete search history.

(56) References Cited

U.S. PATENT DOCUMENTS

| 10,833,877 | B2 | 11/2020 | Ittogi et al. | |
|---|---|---|---|---|
| 10,965,451 | B2 | 3/2021 | Iijima et al. | |
| 2003/0101378 | A1* | 5/2003 | Ohkubo | H01M 10/48 |
| | | | | 714/37 |
| 2019/0305969 | A1 | 10/2019 | Iijima et al. | |

FOREIGN PATENT DOCUMENTS

| CN | 109075965 A | * | 12/2018 | ........... H04L 63/067 |
|---|---|---|---|---|
| JP | 2003162986 A | | 6/2003 | |
| JP | 2009503934 A | * | 1/2009 | ........... H04L 9/0844 |

OTHER PUBLICATIONS https://www.cryptrec.go.jp/report/cryptrec-gl-2003-2016jp.pdf.

* cited by examiner

*Primary Examiner* — Andrew J Steinle
(74) *Attorney, Agent, or Firm* — Venable LLP

(57) ABSTRACT

An authentication-target apparatus receives identification information, a password, and a challenge from an authentication apparatus, hashes the password, executes password authentication by reading out comparison information corresponding to the identification information and comparing the hashed password and the comparison information, generates a response based on the challenge in a case where the password authentication is successful, and transmits the response to the authentication apparatus. The authentication-target apparatus obtains an encrypted authentication calculation code, which is a stored program code corresponding to the identification information, decodes an executable authentication calculation code from the encrypted authentication calculation code using the password successful in the password authentication, and generates the response by executing the authentication calculation code by applying the challenge to the authentication calculation code.

13 Claims, 14 Drawing Sheets

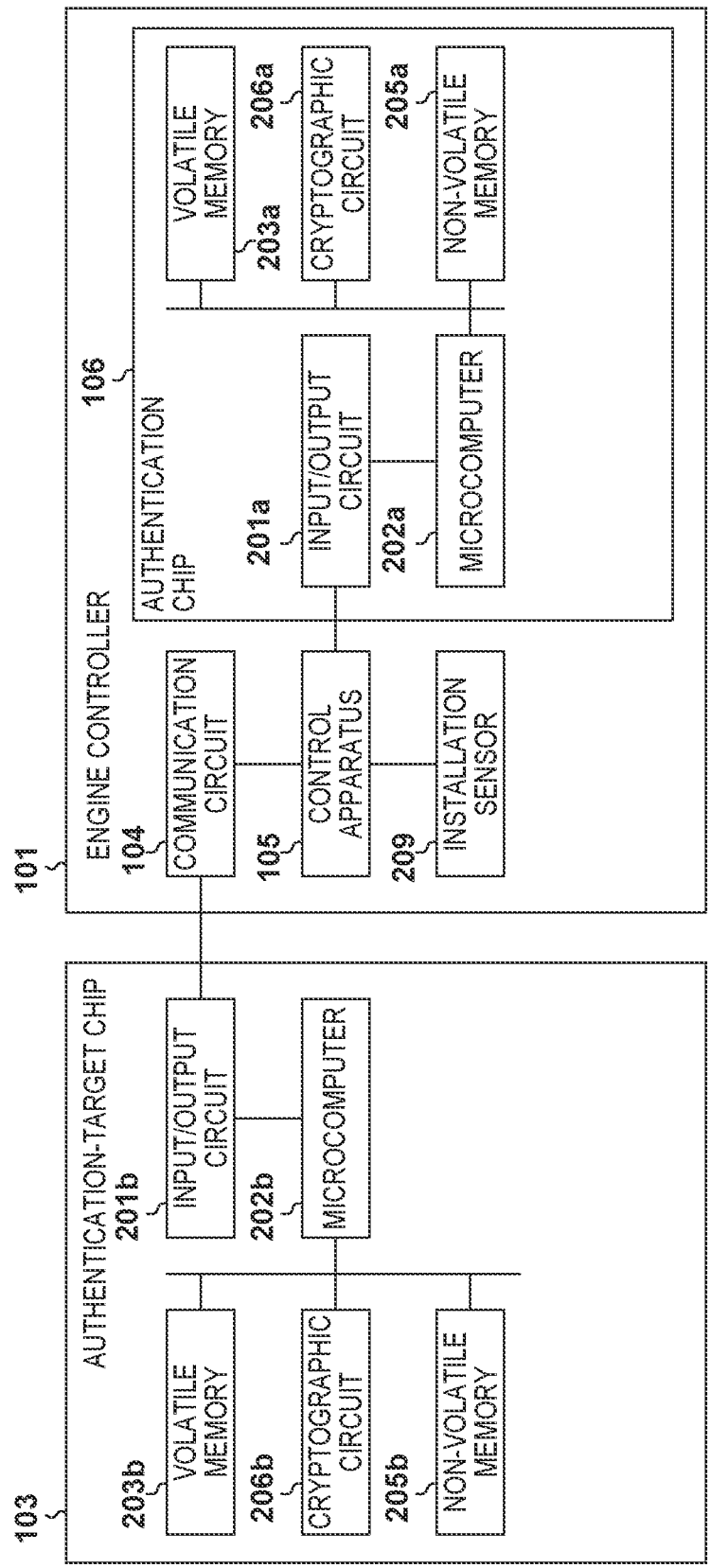

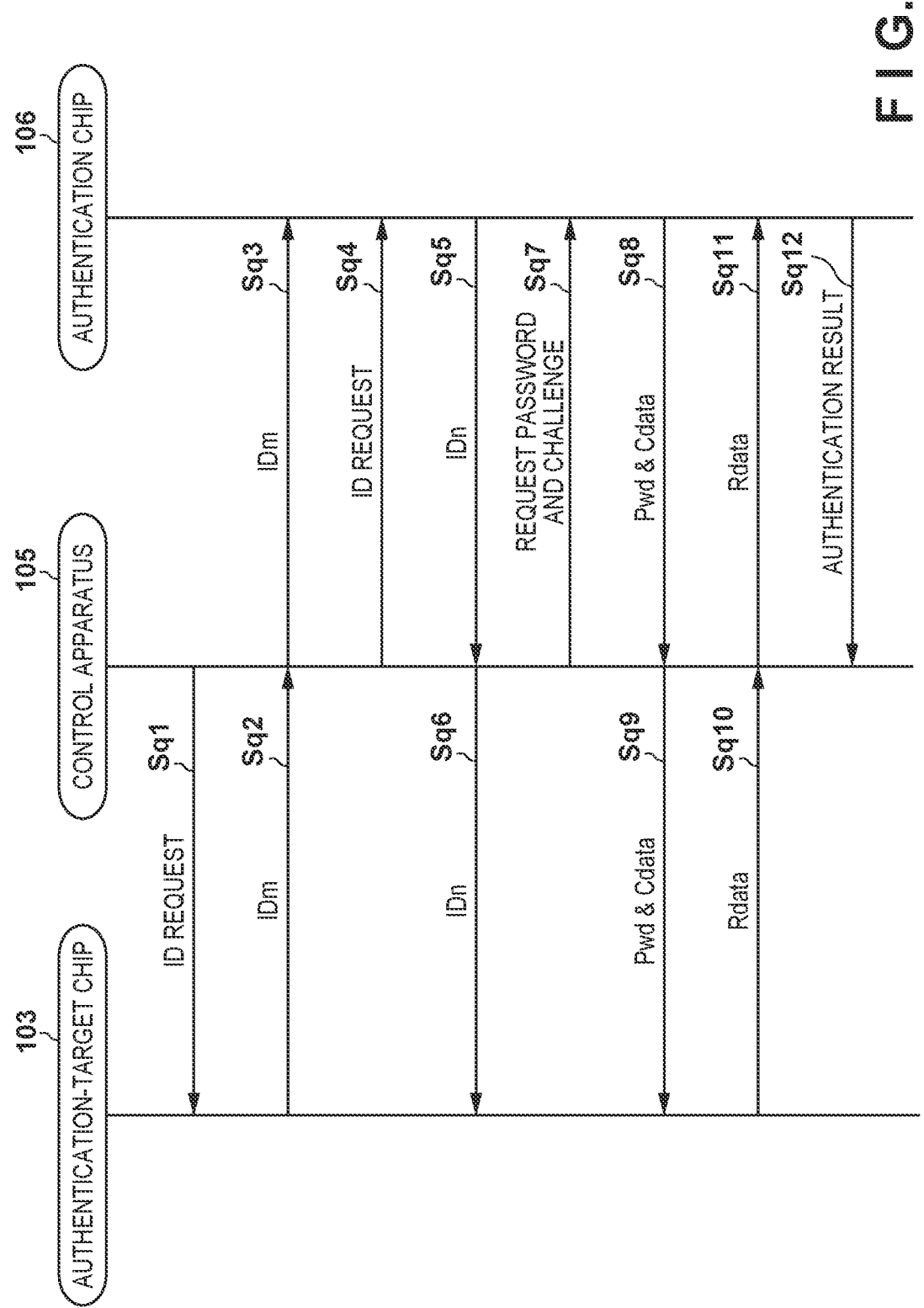

FIG. 5

| ADDRESS | DATA |
|---|---|
| HIGHER-ORDER ↑ | AUTHENTICATION CHIP ID:ID0<br>HASHED PASSWORD:Hpass'(ID0)<br>ENCRYPTED AUTHENTICATION CODE EncAuth(ID0) |
| | AUTHENTICATION CHIP ID:ID1<br>HASHED PASSWORD:Hpass'(ID1)<br>ENCRYPTED AUTHENTICATION CODE EncAuth(ID1) |
| | AUTHENTICATION CHIP ID:ID2<br>HASHED PASSWORD:Hpass'(ID2)<br>ENCRYPTED AUTHENTICATION CODE EncAuth(ID2) |
| | ⋮ |
| | AUTHENTICATION CHIP ID:ID99<br>HASHED PASSWORD:Hpass'(ID99)<br>ENCRYPTED AUTHENTICATION CODE EncAuth(ID99) |
| | AUTHENTICATION-TARGET CHIP IDm |
| | HASH FUNCTION SHA256( ) |
| | DECODING FUNCTION CBC_AES( ) |
| ↓ LOWER-ORDER | OTHER PROGRAMS |

F I G. 6
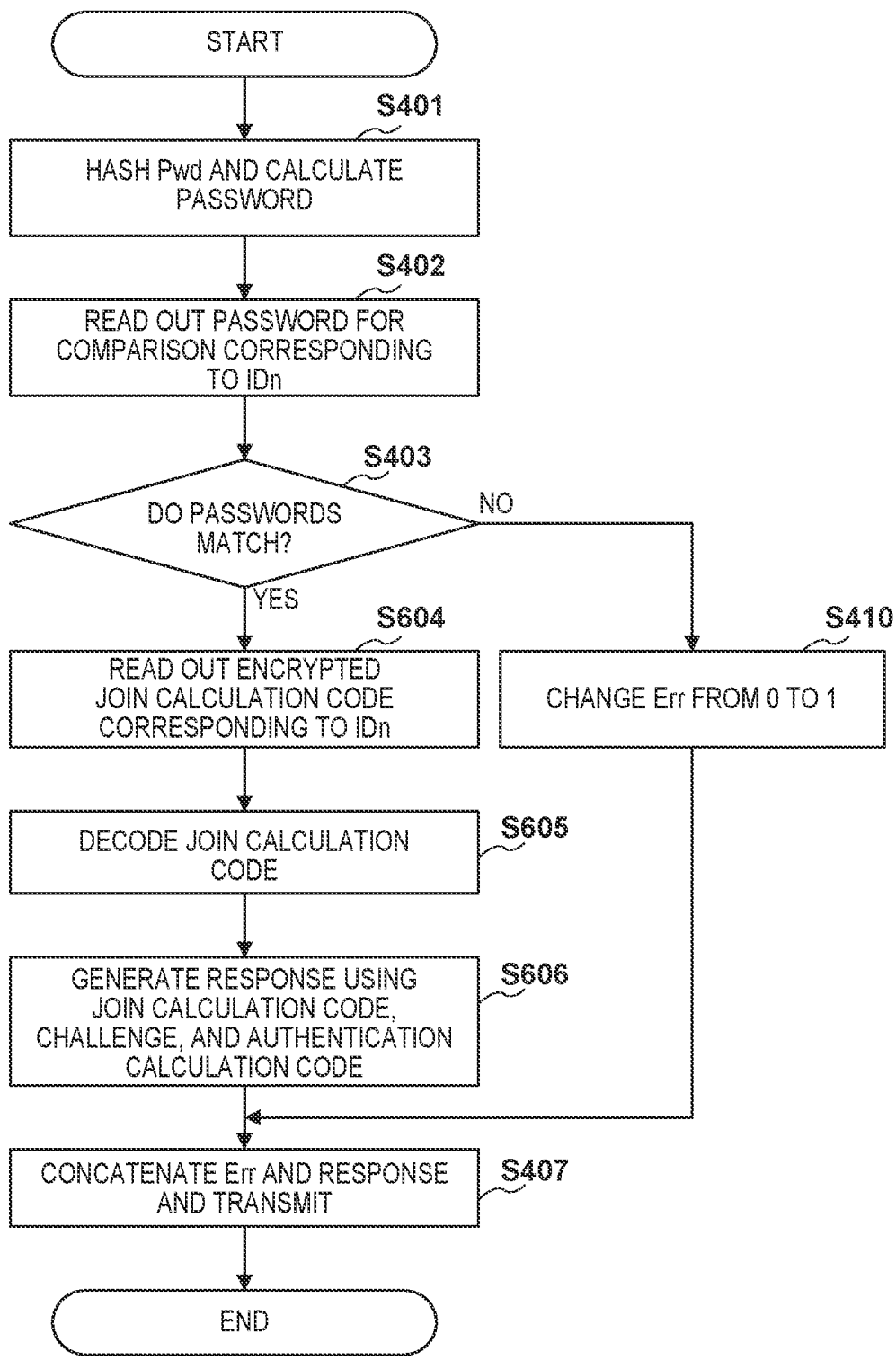

FIG. 7

| ADDRESS | DATA |
|---|---|
| HIGHER-ORDER ↑ | AUTHENTICATION CHIP ID:ID0<br>HASHED PASSWORD:Hpass'(ID0)<br>ENCRYPTED JOIN CALCULATION CODE EncConc(ID0) |
| | AUTHENTICATION CHIP ID:ID1<br>HASHED PASSWORD:Hpass'(ID1)<br>ENCRYPTED JOIN CALCULATION CODE EncConc(ID1) |
| | AUTHENTICATION CHIP ID:ID2<br>HASHED PASSWORD:Hpass'(ID2)<br>ENCRYPTED JOIN CALCULATION CODE EncConc(ID2) |
| | ⋮ |
| | AUTHENTICATION CHIP ID:ID99<br>HASHED PASSWORD:Hpass'(ID99)<br>ENCRYPTED JOIN CALCULATION CODE EncConc(ID99) |
| | AUTHENTICATION-TARGET CHIP IDm |
| | HASH FUNCTION SHA256( ) |
| | DECODING FUNCTION CBC_AES( ) |
| ↓ | AUTHENTICATION FUNCTION Auth( ) |
| LOWER-ORDER | OTHER PROGRAMS |

FIG. 9

| ADDRESS | DATA |
|---|---|
| HIGHER-ORDER ↕ LOWER-ORDER | AUTHENTICATION CHIP ID: ID0<br>ENCRYPTED DATA Encdata(ID0)<br>ENCRYPTED AUTHENTICATION CODE EncAuth(ID0) |
| | AUTHENTICATION CHIP ID:ID1<br>ENCRYPTED DATA Encdata(ID1)<br>ENCRYPTED AUTHENTICATION CODE EncAuth(ID1) |
| | AUTHENTICATION CHIP ID:ID2<br>ENCRYPTED DATA Encdata(ID2)<br>ENCRYPTED AUTHENTICATION CODE EncAuth(ID2) |
| | ⋮ |
| | AUTHENTICATION CHIP ID:ID99<br>ENCRYPTED DATA Encdata(ID99)<br>ENCRYPTED AUTHENTICATION CODE EncAuth(ID99) |
| | AUTHENTICATION-TARGET CHIP IDm |
| | HASH FUNCTION SHA256( ) |
| | DECODING FUNCTION CBC_AES( ) |
| | OTHER PROGRAMS |

AUTHENTICATION SYSTEM FOR PREVENTING REPLICATION OF AUTHENTICATION TARGET APPARATUS AUTHENTICATED BY AUTHENTICATION APPARATUS

BACKGROUND OF THE INVENTION

Field of the Invention

The present invention relates to an authentication system for preventing the replication of an authentication-target apparatus authenticated by an authentication apparatus.

Description of the Related Art

Connecting a component not designed to be connected to an electronic apparatus such as an image forming apparatus may cause the electronic apparatus to malfunction or cause an unexpected event. According to Japanese Patent Laid-Open No. 2003-162986, an ID (identification information) is authenticated to identify whether or not a battery pack is a genuine product.

As described in Japanese Patent Laid-Open No. 2003-162986, an authentication apparatus and an authentication-target apparatus have a common cryptographic key. This allows the manufacture of an authentication-target apparatus that is able to succeed in authentication executed by the authentication apparatus when data analysis of the authentication apparatus or the authentication-target apparatus succeeds.

SUMMARY OF THE INVENTION

The present invention provides an authentication-target apparatus comprising: a reception unit configured to receive identification information, a password, and a challenge from an authentication apparatus; a hash calculation unit configured to hash the password; a password authentication unit configured to execute password authentication by reading out comparison information corresponding to the identification information and comparing the hashed password and the comparison information, a generation unit configured to generate a response based on the challenge in a case where the password authentication is successful, and a transmission unit configured to transmit the response to the authentication apparatus, wherein the generation unit is further configured to obtain an encrypted authentication calculation code, which is a stored program code corresponding to the identification information, decode an executable authentication calculation code from the encrypted authentication calculation code using the password successful in the password authentication, and generate the response by executing the authentication calculation code by applying the challenge to the authentication calculation code.

Further features of the present invention will become apparent from the following description of exemplary embodiments (with reference to the attached drawings).

BRIEF DESCRIPTION OF THE DRAWINGS

FIG. 2 is a diagram for describing an authentication system.
FIG. 3 is a diagram for describing an authentication sequence.
FIG. 5 is a diagram for describing a memory data map.
FIG. 6 is a flowchart illustrating the processing of response generation.
FIG. 7 is a diagram for describing a memory data map.
FIG. 9 is a diagram for describing a memory data map.

DESCRIPTION OF THE EMBODIMENTS

Figure 1A:
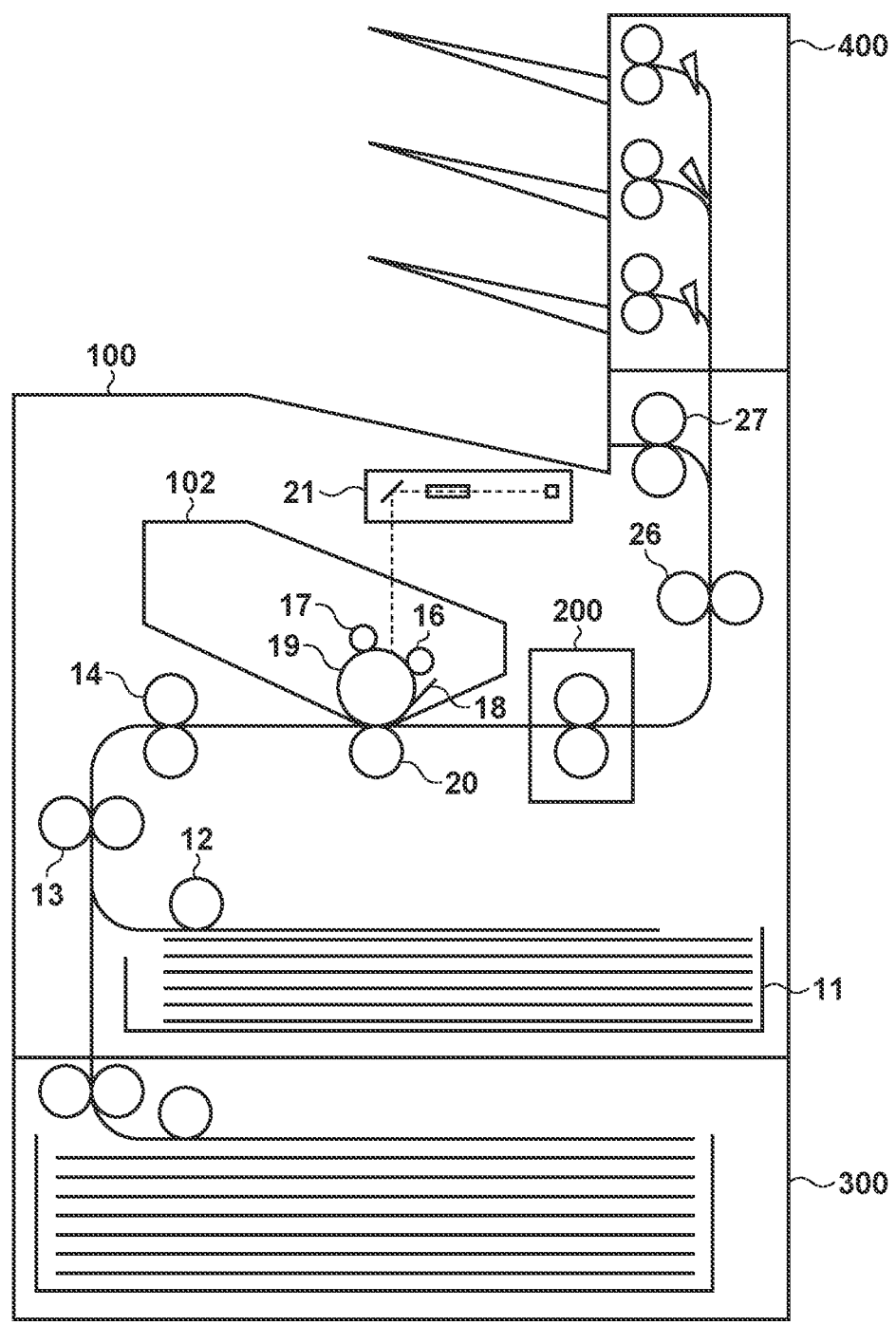
FIG. 1A is a diagram for describing an image forming apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Example 1

Image Forming Apparatus (Authentication System)

FIG. 1A illustrates a schematic configuration of an image forming apparatus 100, an optional sheet feeding apparatus 300, and an optional sheet discharge apparatus 400. The image forming apparatus 100 is, for example, a printer, a copying machine, or a multi-function peripheral that forms an image on a sheet in accordance with an electrophotographic process. A sheet feeding unit 12 supplies a sheet stacked in a sheet stacking unit 11 to conveyance rollers 13 and 14, and the conveyance rollers 13 and 14 convey the sheet. The conveyed sheet is conveyed to a transfer nip portion formed by a transfer roller 20 and a photosensitive drum 19, and a toner image formed on the photosensitive drum 19 is transferred to the sheet. The photosensitive drum 19 uniformly charges its surface via a charging roller 17, and then light emitted from an exposure unit 21 forms an electrostatic latent image. The electrostatic latent image formed in this manner is developed with toner using a developing roller 16 to form a toner image. After the image transferred to the sheet is fixed there by a fixing device 200, the sheet is conveyed by a conveyance roller 26 and a discharge roller 27 and discharged outside the image forming apparatus 100. Here, a process cartridge 102 is constituted by the photosensitive drum 19, the charging roller 17, the developing roller 16, and a cleaner 18 integrally formed and is a replaceable component able to be detached from the image forming apparatus 10X). The fixing device 200 is also a replaceable component able to be detached from the image forming apparatus 100.

The optional sheet feeding apparatus 300 is provided in order to increase the capacity for stacked sheets and can be detached from the image forming apparatus 100. The optional sheet discharge apparatus 400 is an apparatus configured to sort and discharge the sheet on which an image has been formed and can be detached from the image forming apparatus 100.

Figure 1B:
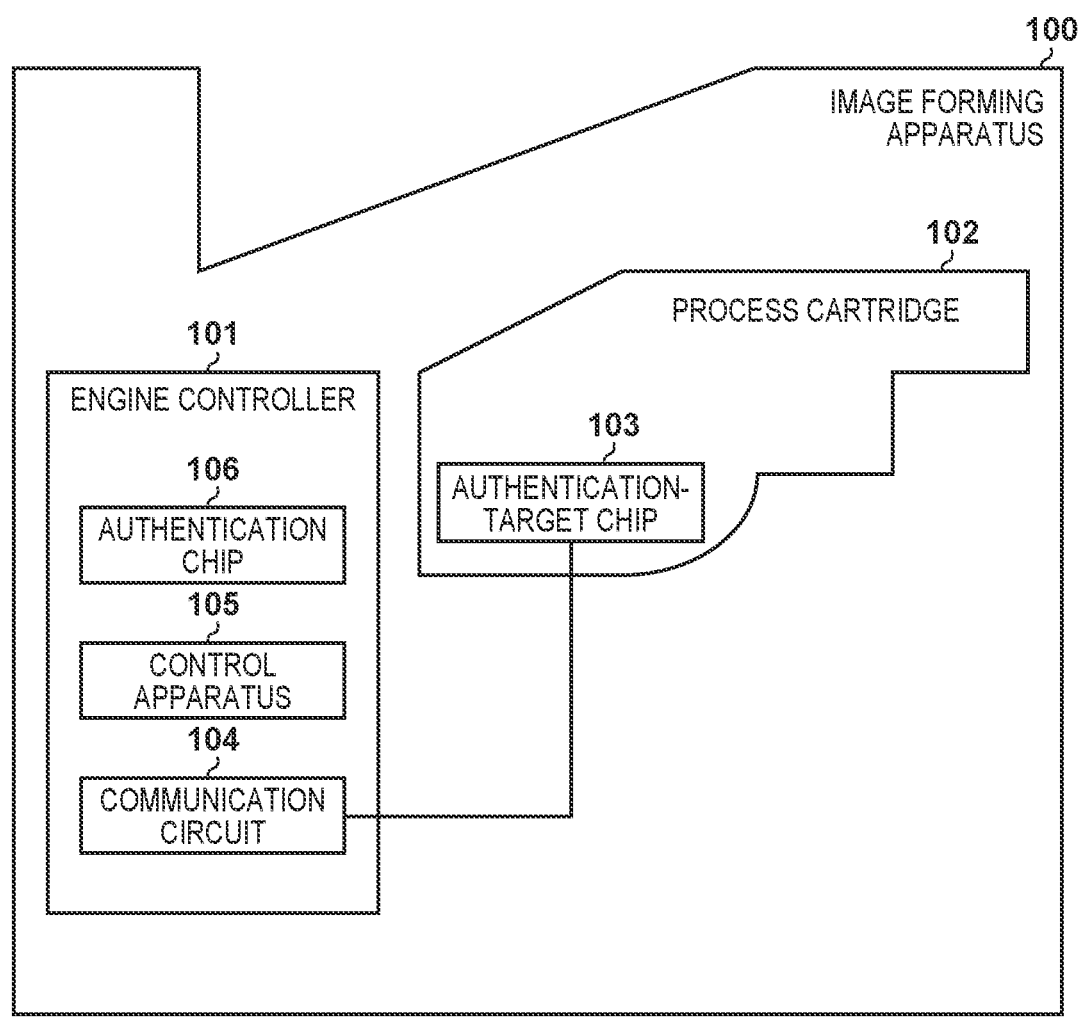
FIG. 1B is a diagram for describing an authentication system.

FIG. 1B illustrates the configuration described with reference to FIG. 1A with the process cartridge 102 also including an authentication chip. A controller 101 includes a control apparatus 105, an authentication chip 106, and a communication circuit 104. The control apparatus 105 is a controller that comprehensively controls the entirety of the image forming apparatus 100. The authentication chip 106 is a semiconductor integrated circuit for authenticating an authentication-target chip 103. The communication circuit 104 is a communication circuit for communicating with the process cartridge 102. The process cartridge 102 is a replaceable component that can be detached from the body of the image forming apparatus 100 and includes the photosensitive drum and the developing unit for supplying toner to the photosensitive drum. The process cartridge 102 includes the authentication-target chip 103. The authentication-target chip 103 is a tamper-resistant chip. The control apparatus 105 instructs the authentication chip 106 to execute authentication when the process cartridge 102 in an installed state is detected by an installation sensor 209. The control apparatus 105 transmits a challenge generated by the authentication chip 106 to the authentication-target chip 103 via the communication circuit 104. The control apparatus 105 transfers a response received from the authentication-target chip 103 to the authentication chip 106 via the communication circuit 104. The control apparatus 105 accepts an authentication result from the authentication chip 106. The authentication-target chip 103 may be embedded in a replaceable component (the fixing device 200), an optional device (the optional sheet feeding apparatus 300, the optional sheet discharge apparatus 400, or the like), or a consumable component of the image forming apparatus 100.

FIG. 2 illustrates an internal configuration of the controller 101 and the authentication-target chip 103. The authentication chip 106 includes an input/output circuit 201a, a microcontroller 202a, a volatile memory 203a, a cryptographic circuit 206a, and a non-volatile memory 205a. The input/output circuit 201a functions as a communication circuit that receives, for example, a command output from the control apparatus 105 and transfers the command to the microcontroller 202a. Also, the input/output circuit 201a transfers response data from the microcontroller 202a to the control apparatus 105. Accordingly, the input/output circuit 201a includes an input circuit (reception circuit) and an output circuit (transmission circuit). The microcontroller 202a is a processor circuit for executing internal processing according to the command received from the control apparatus 105. A program for executing control of the authentication chip 106 is written in the non-volatile memory 205a. The volatile memory 203a is a memory that temporarily stores data when the microcontroller 202a executes data processing. The cryptographic circuit 206a is a circuit for executing an encryption calculation for authentication processing according to a command from the microcontroller 202a.

An input/output circuit 201b is a circuit that is electrically connected to the communication circuit 104 when the process cartridge 102 is installed in the body of the image forming apparatus 100. The input/output circuit 201b receives a command or challenge transmitted from the control apparatus 105 via the communication circuit 104 and outputs this to a microcomputer 202b. The input/output circuit 201b receives a response output from the microcomputer 202b via the communication circuit 104 and outputs the response to the microcontroller 202a. Accordingly, the input/output circuit 201b includes an input circuit (reception circuit) and an output circuit (transmission circuit). The microcontroller 202b is a processor circuit for executing internal processing according to the command from the control apparatus 105. A program and table for executing control of the authentication-target chip 103 is written in a non-volatile memory 205b. A volatile memory 203b is a memory that temporarily stores data when the microcontroller 202b executes data processing. A cryptographic circuit 206b is a circuit for executing an encryption calculation for authentication processing according to a command from the microcontroller 202b.

The authentication processing starts at the control apparatus 105. The control apparatus 105 outputs various commands required for authentication processing to the authentication chip 106 and the authentication-target chip 103. The authentication chip 106 and the authentication-target chip 103 each execute processing according to the corresponding command and returns to the control apparatus 105 an execution result as a response to the command. The control apparatus 105 is not required, and the authentication chip 106 and the authentication-target chip 103 may communicate with each other directly.

Authentication Sequence

FIG. 3 illustrates an authentication sequence executed by the authentication-target chip 103, the control apparatus 105, and the authentication chip 106. The control apparatus 105 starts the authentication sequence when the process cartridge 102 in an installed state is detected by an installation sensor 209.

In Sq1, the control apparatus 105 sends a request to the authentication-target chip 103 to transmit to the control apparatus 105 identification information IDm of the authentication-target chip 103. The authentication-target chip 103 receives this request. The identification information IDm is stored in the non-volatile memory 205b. m is an index and is an integer equal to or greater than 0. The length of IDm is 16 bytes or more. The identification information IDm is identification data held in the authentication-target chip 103, but does not need to be unique information. In other words, the same identification information IDm may be stored in a plurality of different authentication-target chips.

In Sq2, the authentication-target chip 103 reads the identification information IDm from the non-volatile memory 205b and transmits the identification information IDm to the control apparatus 105. The control apparatus 105 receives the identification information IDm.

In Sq3, the control apparatus 105 transfers the identification information IDm to the authentication chip 106. The authentication chip 106 receives the identification information IDm.

In Sq4, the control apparatus 105 sends a request to the authentication chip 106 to transmit to the control apparatus 105 identification information IDn of the authentication chip 106. The authentication chip 106 receives this request. n is an index and is an integer equal to or greater than 0. The length of IDn is 16 bytes or more. The identification information IDn is identification data held in the authentication chip 106, but does not need to be unique information. In other words, the same identification information IDn may be stored in a plurality of different authentication chips.

In Sq5, the authentication chip 106 reads the identification information IDn from the non-volatile memory 205a and transmits the identification information IDn to the control apparatus 105. The control apparatus 105 receives the identification information IDn.

In Sq6, the control apparatus 105 transfers the identification information IDn to the authentication-target chip 103. The authentication-target chip 103 receives the identification information IDn. When Sq1 to Sq6 has been executed, the authentication-target chip 103 and the authentication chip 106 have both obtained to other's identification information. IDn and IDm are identification information with a finite number, and the length thereof needs to be 16 bytes or close to. IDn and IDm may be determined at random to ensure that they are not easily deduced.

In Sq7, the control apparatus 105 sends a request to the authentication chip 106 for a 16-byte password Pwd and a 16-byte challenge Cdata. The password Pwd and the challenge Cdata may be referred to as authentication information. The authentication chip 106 calculates the password Pwd and the challenge Cdata via the following process, for example.

$$\text{Pwd}=\text{SHA256}(\text{ID}m\|M\text{pwd}) \qquad (1)$$

SHA256 is a cryptographic hash function. The details of SHA256 are specified in NIST_FIPS_PUB 180-4, for example. The hash function is one example of a one-way function. One-way function is term used to refer to a function that generates output data from input data, but computation in the reverse direction cannot be done. Mpwd is a master password held by the authentication chip 106 and is stored in the non-volatile memory 205a. $\|$ is a concatenation operator and means concatenating two data strings into one data string. SHA256 is a function for outputting 32-byte data. The authentication chip 106 selects the higher-order 16 bytes of the 32-byte data and generates a Pwd. In other words, the higher-order 16 bytes correspond to the Pwd. Using Formula (1), a different password Pwd for each identification information IDm is generated. The master password Mpwd is different for each identification information IDn. As a result, the password Pwd is associated with the identification information IDm of the authentication-target chip 103 and the identification information IDn of the authentication chip 106. Note that the password Pwd may be referred to as derived information generated from the master password Mpwd. The calculation of SHA256 in Formula (1) is performed by the microcomputer 202a executing a calculation program stored in the non-volatile memory 205a while receiving assistance from the cryptographic circuit 206a. The data part-way through the calculations generated from the calculation of SHA256 and the calculation result data are temporarily stored in the volatile memory 203a. For the authentication-target chip 103 as well, a password calculated in advance using Formula (1) may be written in the non-volatile memory 205b of the authentication-target chip 103. The Pwd may be determined using a table instead of Formula (1). For example, a password table in which identification information ID (IDm) and passwords (Pwd) are associated may be stored in the non-volatile memory 205a. The microcontroller 202a may obtain a Pwd corresponding to an IDm by referencing the password table.

The authentication chip 106 randomly generates the challenge Cdata. For example, the microcontroller 202a may randomly generate the challenge Cdata using a pseudorandom number generator provided in the cryptographic circuit 206a. Note that the challenge Cdata is stored in the volatile memory 203a and used when confirming a response.

In Sq8, the authentication chip 106 transmits the password Pwd and the challenge Cdata to the control apparatus 105. The control apparatus 105 receives the password Pwd and the challenge Cdata from the authentication chip 106.

In Sq9, the control apparatus 105 transfers the password Pwd and the challenge Cdata to the authentication-target chip 103. The authentication-target chip 103 receives the password Pwd and the challenge Cdata from the control apparatus 105.

In Sq10, the authentication-target chip 103 generates a response Rdata based on the password Pwd and the challenge Cdata and transmits the response Rdata to the control apparatus 105. The control apparatus 105 receives the response Rdata from the authentication-target chip 103.

In Sq11, the control apparatus 105 transfers the response Rdata to the authentication chip 106. The authentication chip 106 receives the response Rdata from the control apparatus 105, performs authentication calculation using the response Rdata, and generates an authentication result.

In Sq12, the authentication chip 106 transmits the authentication result to the control apparatus 105. The control apparatus 105 receives the authentication result from the authentication chip 106.

Response Generation

Figure 4:
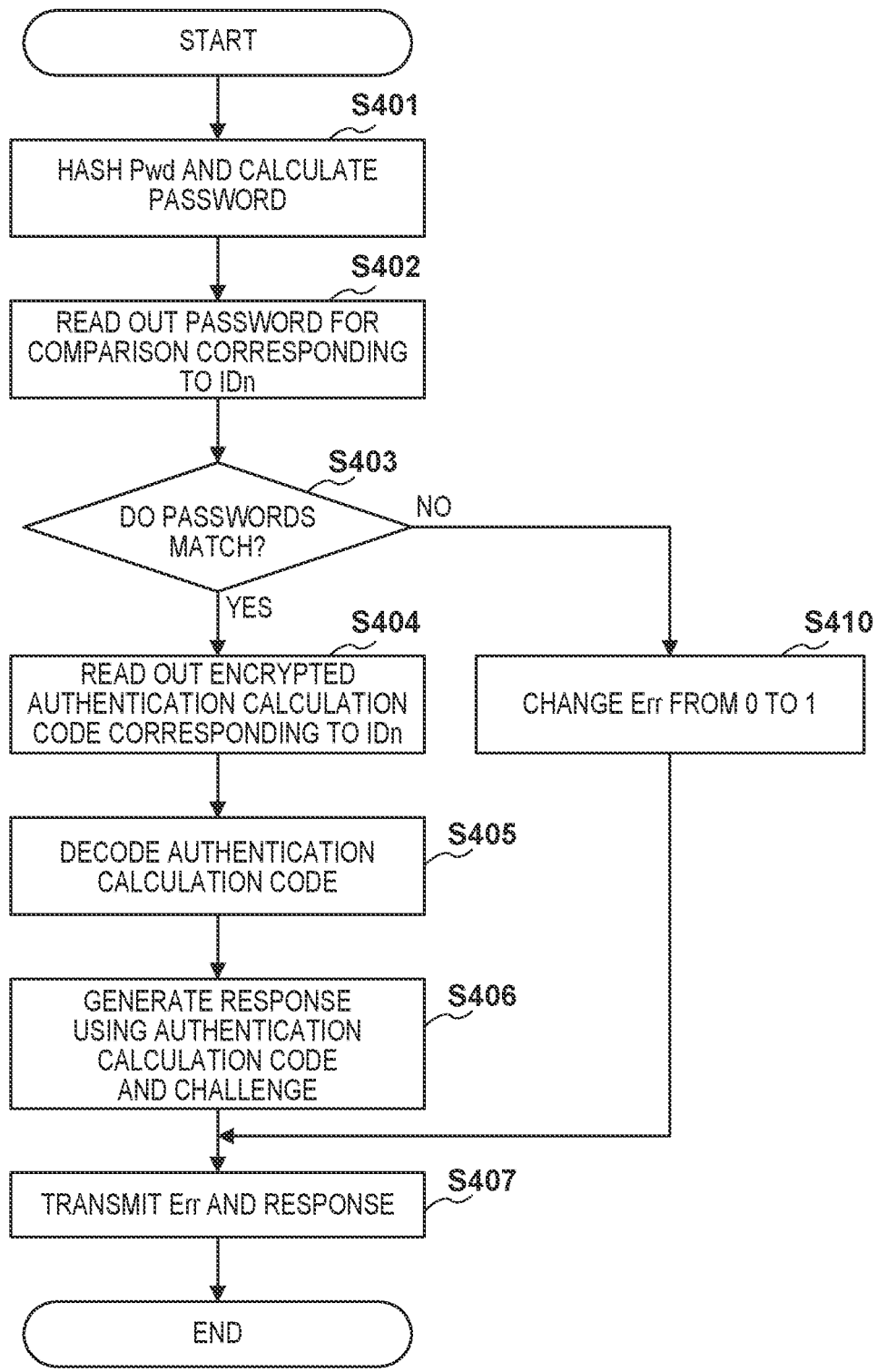
FIG. 4 is a flowchart illustrating the processing of response generation.

FIG. 4 illustrates password authentication and response generation executed by the microcomputer 202b of the authentication-target chip 103.

In step S401, the microcomputer 202b hashes the password Pwd and generates a hashed password Hpass. This hashing may be executed using Formula (2).

$$H\text{pass}=H(\text{Pwd})=\text{SHA256}(\text{Pwd}) \qquad (2)$$

Here, H is a cryptographic hash function. SHA256 is also used in Formula (2). SHA256 in Formula (2) may be provided by the microcomputer 202b executing a calculation program stored in the non-volatile memory 205b while receiving assistance from the cryptographic circuit 206b. The data part-way through the calculation of SHA256 and the calculation result data are temporarily stored in the volatile memory 203b.

In step S402, the microcomputer 202b reads out a password for comparison (a hashed password Hpass'(IDn)) corresponding to the identification information IDn of the authentication chip 106. For example, the microcomputer 202b searches a table stored in the non-volatile memory 205b and reads out Hpass'(IDn) corresponding to the identification information IDn. The microcomputer 202b temporarily stores Hpass'(IDn) in the volatile memory 203b.

In step S403, the microcomputer 202b determines whether or not the two passwords match. In other words, the microcomputer 202b compares Hpass and Hpass'(IDn). Hpass'(IDn) is determined in advance to satisfy Formula (1) and Formula (2). In other words, to satisfy Formula (3), Hpass'(IDn) is calculated and stored in a table of the non-volatile memory 205b.

$$H\text{pass}'(\text{ID}n)=\text{SHA256}(\text{SHA256}(\text{ID}m\|M\text{pwd})) \qquad (3)$$

In a case where the two passwords do not match, the microcomputer 202b proceeds the processing to step S410. In step S410, the microcomputer 202b changes an error bit Err from 0 to 1. The error bit Err has a default value of 0. The error bit Err together with the response Rdata forms the response data. In other words, the error bit Err is stored in one field from among the plurality of fields that form the response data. Then, in step S407, the microcomputer 202b concatenates the error bit Err and the response Rdata, generates response data, and transmits the response data to the control apparatus 105. In step S403, in a case where the two passwords do match, the microcomputer 202b proceeds the processing to step S404.

In step S404, the microcomputer 202b searches for an encrypted authentication calculation code EncAuth(IDn) associated with the identification information IDn in the table in the non-volatile memory 205b and reads out the encrypted authentication calculation code EncAuth(IDn). The encrypted authentication calculation code EncAuth(IDn) is generated in advance by encrypting an authentication calculation code Auth(IDn), which is an executable program code. The microcomputer 202b temporarily stores EncAuth(IDn) in the volatile memory 203b.

In step S405, the microcomputer 202b decodes the authentication calculation code Auth(IDn) from the encrypted authentication calculation code EncAuth(IDn). For example, the microcomputer 202b may read out a decoded function Dec( ) from the non-volatile memory 205b and decode the authentication calculation code Auth(IDn) from the authentication calculation code EncAuth(IDn) on the basis of the decoded function Dec( ). The decoded function Dec( ) may be a decoded function based on an AES algorithm such as that specified in NIST_FIPS_PUB 197. The microcomputer 202b temporarily stores the decoded function Dec( ) in the volatile memory 203b. The microcomputer 202b obtains the authentication calculation code Auth(IDn) using Formula (4).

$$\text{Auth}(IDn)=\text{Dec}(Pwd,\text{EncAuth}(IDn))=\text{CBC\_AES\_Dec}(Pwd,\text{EncAuth}(IDn)) \quad (4)$$

Here, CBC_AES_Dec may be a cipher block chaining (CBC) block mode decoding function specified in NIST SP 800-38A. Here, AES is used as the primitive function of the decoding function. The input payload of CBC_AES_Dec is a decoding key Pwd. The output message code of CBC_AES_Dec is EncAuth(IDn).

Encrypting or decoding a long message using AES alone makes it vulnerable to a statistical analysis method. Using AES of a CBC block mode as a decoding function makes it resistant to a statistical analysis method.

The microcomputer 202b calculates Formula (4) by executing a calculation program stored in the non-volatile memory 205b while receiving assistance from the cryptographic circuit 206b. The microcomputer 202b temporarily stores the authentication calculation code Auth (IDn) in the volatile memory 203b.

A decoding function of a CBC mode is used in Formula (4), however the encrypting function and the decoding function are dualistic and can be transformed in the reverse direction. Accordingly, the decoding function may be substituted with the encrypting function. Important to note is that Auth(IDn) is a program code able to be executed by the microcomputer 202b.

An example of the authentication calculation code Auth (IDn) includes a message authentication code CMAC specified in NIST SP 800-38B. CMAC is an authentication algorithm devised for message authentication using the encrypting function AES. The input parameters of CMAC are a cryptographic key K and a message M. CMAC generates a message authentication code corresponding to the cryptographic key K and the message M. Accordingly, the authentication calculation code Auth (IDn) is a program code represented by Formula (5).

$$\text{Auth}(\text{input})=\text{CMAC}(K=Kn,M=\text{input}) \quad (5)$$

Here, Kn is a key provided in advance in the generated authentication calculation code Auth(input) (i.e., Auth (IDn)). The key Kn corresponds to the identification information IDn. The authentication calculation code Auth (IDn) corresponding to Formula (5) set with the key Kn corresponding to various IDns is prepared in advance. Furthermore, Auth(IDn) is encrypted with an inverse function (i.e., an encrypting function) of the decoding function defined by Formula (4). The encrypted Auth(IDn) is stored in the non-volatile memory 205b as EncAuth(IDn). Accordingly. Formula (4) and Formula (5) are satisfied. The number of EncAuth(IDn) matches the number of identification information IDn. In other words, the EncAuth(IDn) corresponding to each and every identification information IDn existing in the market is stored in the non-volatile memory 205b. Formula (5) indicates that the authentication calculation code Auth (IDn) is the message authentication code CMAC including the authentication key Kn.

CMAC is used in the example for Formula (5), but this is merely one example. Instead of CMAC, HMAC may be used. HMAC is a message authentication algorithm that utilizes a cryptographic hash function such as SHA256 specified in NIST_FIPS_PUB 198-1. In this case, Formula (5) is substituted with Formula (6).

$$\text{Auth}(\text{input})=\text{HMAC}(K=Kn\|M=\text{input}) \quad (6)$$

Here, Kn is a key provided in advance in the authentication calculation code Auth (IDn) and corresponds to the identification information IDn. As in Formula (5), the plurality of authentication calculation codes Auth (IDn) corresponding to Formula (6) are prepared in advance. The authentication calculation code Auth (IDn) is encrypted with an inverse function (i.e., an encrypting function) of the decoding function defined by Formula (4). Accordingly, an encrypted authentication calculation code EncAuth(IDn) is generated and stored in the non-volatile memory 205b. Formula (6) indicates that the authentication calculation code Auth (IDn) is the message authentication code HMAC including the authentication key Kn.

In step S406, the microcomputer 202b generates the response Rdata using the authentication calculation code Auth (IDn) and the challenge Cdata. Formula (7) may be used in this generation, for example.

$$R\text{data}=\text{Auth}(C\text{data}) \quad (7)$$

In step S408, the microcomputer 202b transmits the error bit Err and the response Rdata to the control apparatus 105. For example, the microcomputer 202b concatenates the response Rdata and the error bit Err, generates response data Err||Rdata, and transmits the response data Err||Rdata to the control apparatus 105. In step S403, in a case where the two passwords match, the error bit Err is 0.

Memory Data Map

FIG. 5 illustrates a memory data map of the non-volatile memory 205b of the authentication-target chip 103. As illustrated in FIG. 5, one set including the identification information IDn of the authentication chip 106, the hashed password Hpass'(IDn), and the encrypted authentication calculation code EncAuth(IDn) are formed for each index n. The microcomputer 202b can read out from the non-volatile memory 205b the hashed password Hpass'(IDn) and the encrypted authentication calculation code EncAuth(IDn) corresponding to the received identification information IDn.

The identification information IDm allocated to the authentication-target chip 103, the hash function SHA256( ), the decoding function CBC_AES( ), and other programs may also be stored in the non-volatile memory 205b. Other programs include the program code described above.

Authentication Processing with Authentication Chip

As described regarding Sq11, the microcontroller 202a of the authentication chip 106 receives the authentication calculation result generated by the authentication-target chip 103 as response data. The microcontroller 202a inputs the challenge Cdata into the authentication calculation code Auth (IDn) as the payload and executes authentication calculation code Auth(Cdata). The microcontroller 202a temporarily stores the execution result (authentication result) in the volatile memory 203a. The authentication calculation code Auth (IDn) is the same as that represented by Formula (5) and is stored in the non-volatile memory 205a as plaintext. The authentication calculation code Auth (IDn) corresponds to the identification information IDn. In other words, the authentication calculation code Auth (IDn) executed by the authentication-target chip 103 and the authentication calculation code Auth(IDn) executed by the authentication chip 106 are the same. Accordingly, in a case where the same payload is input, the authentication result (for example, Rdata) obtained by the authentication-target chip 103 and the authentication result (for example, Auth (Cdata)) obtained by the authentication chip 106 are the same.

The microcontroller 202a separates the error bit Err from the response data and determines whether the error bit Err is 0 or 1. In other words, whether or not password authentication is successful is confirmed. In a case where password authentication is successful, the microcontroller 202a executes comparison of the response Rdata and Auth(Cdata). In a case where password authentication is unsuccessful, the microcontroller 202a does not execute comparison of the response Rdata and Auth(Cdata). The microcomputer 202a transmits the comparison result as the authentication result to the control apparatus 105. In a case where the response Rdata and Auth(Cdata) do not match, the control apparatus 105 outputs a notification indicating that the process cartridge 102 is not a genuine product. This notification may be displayed on a display device or the like connected to the control apparatus 105.

The microcontroller 202a also uses the authentication calculation code Auth (IDn) represented by Formula (5), but this is merely an example. In a case where the microcomputer 202b is programmed to use Formula (6), the microcontroller 202a is also programmed to use Formula (6). It is important to note that the authentication calculation code executed by the authentication-target chip 103 and the authentication calculation code executed by the authentication chip 106 match. Because the authentication calculation code Auth (IDn) is associated with the identification information IDn, the authentication calculation code may be switched in the manner described below. For example, in a case where IDn=0x . . . 00, the microcomputer 202 selects the authentication calculation code of Formula (5). In a case where IDn=0x . . . 01, the microcomputer 202 uses the authentication calculation code of Formula (6).

Advantage of Example 1

A: the authentication-target chip 103 is provided with a plurality of encrypted authentication calculation codes EncAuth(IDn) that are different for each identification information IDn. Unless the correct password Pwd associated with the identification information IDm and the identification information IDn is input into the authentication-target chip 103, the encrypted authentication calculation code EncAuth (IDn) cannot be obtained. Thus, the correct authentication calculation code Auth(IDn) can also not be obtained.

B: The authentication-target chip 103 stores the password Hpass'(IDn) hashed by a cryptographic hash function in the non-volatile memory 205b. Accordingly, even in a case where the hashed password Hpass'(IDn) is attacked and exposed, the password Pwd is not exposed.

C: The master password Mpwd stored in the authentication chip 106 is associated with the identification information IDn. Accordingly, even in a case where the identification information IDx stored in the controller 101 is exposed, the master password Mpwd of the other controller 101 storing a different identification information IDy is not exposed.

D: The authentication chip 106 includes the authentication calculation code Auth( ) in plaintext. The authentication calculation code Auth(IDm) is associated with the identification information IDm. Thus, when the identification information IDm is different, the authentication calculation code Auth(IDm) is also different. In a case where the authentication calculation code Auth( ) provided in the controller 101 allocated with the identification information IDx is exposed, the authentication calculation code Auth( ) of the other controller 101 storing a different identification information IDy is not exposed.

There are multiple combinations of the identification information IDn and the identification information IDm. Thus, even in a case where the password Pwd exchanged between a certain combination of the controller 101 and the process cartridge 102 is exposed, the password Pwd of another combination is not exposed. Also, it is difficult to obtain the authentication calculation code of every controller 101. Accordingly, the confidentiality of the password for each controller 101 and the confidentiality of the authentication calculation code are sufficiently ensured.

With such an Example 1, authentication analysis by an attacker is very difficult. Even in a case of an attack on the authentication-target chip 103 via hardware failure resulting in the password stored in the non-volatile memory 205b and the encrypted authentication calculation code being read, decoding the encrypted authentication calculation code is difficult. Even in a case where all of the storage contents of the non-volatile memory 205b of the authentication-target chip 103 are copied, copying or emulating all of the operations of the microcomputer 202b is difficult. To achieve such a task and copy everything including the hardware would require an enormous amount of labor and money and is not realistically plausible. Also, replicating the microcomputer 202 with a general-purpose microcontroller is also difficult. This is because the calculation command format of the microcomputer 202 and the calculation command format of a general-purpose microcontroller are different.

IDn, IDm, and Pwd are each assumed to have a length of 16 bytes. This is effective in making a total number search practically difficult. However, depending on the security tolerance level, IDn, IDm, and Pwd may be shorter in length or longer in length.

In Formula (4), an AES encryption block mode CBC_AES is used. However, this is merely an example. Another block mode such as CFB_AES, OFB_AES, CTR_AES, and the like specified in NIST SP 800-38A may be used.

In this example, common key system block encryption based on AES is used. In an alternative example, a common key system stream cipher technology may be used. In this case, a stream cipher is generated by generating a pseudo-random number bit stream corresponding to the common key and calculating the exclusive or of the bit stream and the message. The pseudorandom number bit stream is able to be generated by various methods. For example, a cryptographic hash function may be used. For example, by concatenating an encrypted password Pwd and a counter CTR+, a payload Pwd||CTR+ of SHA256( ) is generated. The calculation result is represented by SHA256(Pwd||CTR+). This calculation is repeatedly executed while increasing the counter CTR+. This execution result is represented by Repeat_SHA256(Pwd||CTR+). Furthermore, the exclusive or .xor. of Repeat_SHA256(Pwd||CTR+) and a message EncAuth(IDn) is calculated. Formula (8) is substituted for Formula (4).

$$\text{Auth}( )=\text{Repeat\_SHA256(Pwd\|CTR+).xor.EncAuth} \\ (\text{ID}n) \tag{8}$$

Here, .xor. is an operator indicating exclusive or.

Formula (5) and Formula (6) give examples of the authentication calculation code. In Formula (5), the message authentication code CMAC is used. As the common key block encryption based on CMAC, AES is standard, but other block encryption technology may be used. For example, block encryption technology lightweight in terms of program data (for example, Simon, Speck, Midori, and the like) specified in a lightweight cryptography guideline (https://www.cryptrec.go.jp/report/cryptrec-gl-2003-2016jp.pdf) by the Japanese Cryptography Research and Evaluation Committees (CRYPTREC) may be used. This allows the amount of program data for the authentication calculation code Auth( ) to be reduced.

Example 2

In Example 1, the authentication calculation code Auth( ) is decoded from the encrypted authentication calculation code EncAuth( ), and the challenge Cdata is input into the authentication calculation code Auth( ). The encrypted authentication calculation code EncAuth( ) is prepared in advance for each identification information IDn.

In Example 2, the authentication calculation code Auth( ) prepared is common to a plurality of pieces of identification information IDn. However, the program code (join calculation code Conc( )) that generates data to be input into the authentication calculation code Auth( ) is encrypted. If we consider the join calculation code Conc( ) a part of the authentication calculation code Auth( ), this means that a part of the authentication calculation code Auth( ) is encrypted. The join calculation code Conc( ) is different for each identification information IDn. An encrypted join calculation code EncConc( ) is decoded to generate a plaintext join calculation code Conc( ). The challenge Cdata is processed by the join calculation code Conc( ) and input into the authentication calculation code Auth( ). In Example 2, descriptions of points shared with Example 1 are omitted.

FIG. 6 illustrates the processing of Example 2. FIG. 6 is different from FIG. 4 in that step S404 to step S406 is substituted with step S604 to step S606. Here, the join calculation code Conc( ) is newly defined. The join calculation code Conc( ) is a uniquely determined function and is a program code that divides, concatenates, or executes exclusive or of two data strings.

In step S604, the microcomputer 202b searches for the encrypted join calculation code EncConc(IDn) corresponding to the identification information IDn in the table in the non-volatile memory 205b and reads out the encrypted join calculation code EncConc(IDn). The microcomputer 202b temporarily stores EncConc(IDn) in the volatile memory 203b.

In step S605, the microcomputer 202b decodes the encrypted join calculation code EncConc(IDn). First, the microcomputer 202b reads out the decoded function Dec( ) from the non-volatile memory 205b. Dec( ) may be the same as that described in Example 1. The decoded function Dec( ) is temporarily stored in the volatile memory 203b. The microcomputer 202b obtains a plaintext join calculation code Conc( ) using Formula (9).

$$\text{Conc}( )=\text{Dec(Pwd,EncConc(ID}n))=\text{CBC\_AES\_Dec} \\ (\text{Pwd,EncConc(ID}n)) \tag{9}$$

CBC_AES_Dec and substitutes thereof are that described in Example 1. The microcomputer 202b obtains the join calculation code Conc( ) by executing a calculation program stored in the non-volatile memory 205b w % bile receiving assistance from the cryptographic circuit 206b. The join calculation code Conc( ) is a program code able to be executed by the microcomputer 202b. The join calculation code Conc( ) is temporarily stored in the volatile memory 203b. Formula (9) represents a CBC mode decoding function. However, the encrypting function and the decoding function are dualistic and can be transformed in the reverse direction. Accordingly, the decoding function may be substituted with the encrypting function.

The join calculation code Conc( ) executes calculation using the key Kn it holds and a message input. The key Kn and the message input are data strings of 16 bytes. Here, Conc( ) is represented in Formula (10).

$$\text{Conc(input)}=Kn\|\text{input} \tag{10}$$

Here, the key Kn is key information provided in advance in the join calculation code Conc( ) and corresponds to the identification information IDn. The join calculation code Conc( ) corresponding to Formula (10) set with the key Kn corresponding to IDn is prepared in advance. The join calculation code Conc( ) is encrypted by an inverse function (i.e., an encrypting function) of a decoding function defined by Formula (9) and becomes the encrypted join calculation code EncConc(IDn). The encrypted join calculation code EncConc(IDn) for each identification information IDn is stored in the non-volatile memory 205b. This is the reason Formula (9) and Formula (10) are satisfied. The number of Conc(IDn) and the number of pieces of identification information ID match.

FIG. 7 illustrates a memory data map of the non-volatile memory 205b. In FIG. 7, instead of the encrypted authentication calculation code EncAuth(IDn), the encrypted join calculation code EncConc(IDn) is stored. Furthermore, a shared and plaintext authentication calculation code Auth( ) is also stored.

In step S606, the microcomputer 202b generates the response Rdata using the join calculation code Conc( ), the challenge Cdata, and the authentication calculation code Auth( ). The microcomputer 202b reads out the authentication calculation code Auth( ) from the non-volatile memory 205b. For example, the microcomputer 202b generates the response Rdata using Formula (11).

$$R\text{data}=\text{Auth(Conc(}C\text{data))}=\text{HMAC(Conc(}C\text{data))} \tag{11}$$

HMAC and a substitute CMAC are as described in Example 1. In Example 1, Cdata is directly input into the authentication calculation code Auth( ). In Example 2, Conc(Cdata) is input into the authentication calculation code Auth( ).

Advantage of Example 2

In Example 1, the authentication calculation code is decoded from the encrypted authentication calculation code corresponding to the identification information IDn and the authentication calculation code is executed. In Example 2, the join calculation code is decoded from the encrypted join calculation code corresponding to the identification information IDn and an input for the authentication calculation code is generated by the join calculation code. In other words, the authentication calculation code is not encrypted. Typically, an authentication function program code utilizing common key cryptography takes up a few Ks of bytes of the program's capacity. In Example 1, pieces of identification information IDn and the same number of encrypted authentication calculation codes need to be stored in the non-volatile memory 205b. However, because the storage capacity of the non-volatile memory 205b is limited, the number of pieces of identification information IDn able to be stored is limited. In Example 2, a join calculation code per each piece of identification information IDn is prepared, but there is only one authentication calculation code. The program size of the join calculation code is smaller than the program size of the authentication calculation code. For example, the program size of a simple data concatenation is approximately tens of bytes. Thus, in Example 2, the number of pieces of identification information IDn able to be stored can be increased. In this manner, by encrypting only a part of the authentication function used in authentication calculation into the identification information IDn, the storage area of the non-volatile memory 205b can be effectively used.

Formula (10) uses concatenation of two data strings. However, this is merely an example. As seen with Formula (12), the exclusive or of two data strings may be used.

$$\text{Conc(input)} = Kn.\text{xor.input} \qquad (12)$$

In this case, the length of the data output by Conc(input) is half (16 bytes) of that of Formula (10).

A slightly more complex structure may also be used for the join calculation code Conc( ).

$$\text{Conc(input)} = Kn\_1.\text{xor.input}\_1 \| Kn\_u.\text{xor.input}\_u \qquad (13)$$

Here, Kn_1 is the lower-order 8 bytes of the key Kn, and Kn_u is the higher-order 8 bytes. input_1 is the lower-order 8 bytes of the input, and input_u is the higher-order 8 bytes. A Conc( ) may be used that is obtained by dividing the input plurality of data into a plurality and combining, concatenating, or applying exclusive or on the plurality of subdata generated by the division. It is important to note that because the information is preprocessed by various formulas before being input into the authentication calculation code Auth( ), the amount of input information is not decreased. As long as the join calculation code Conc( ) is encrypted, a plaintext authentication calculation code Auth( ) is sufficient. Accordingly, deducing the authentication calculation result (response) via the authentication calculation code is extremely difficult.

Example 3

In Examples 1 and 2, the authentication-target chip 103 hashes the password of the authentication chip 106 via a cryptographic hash function and compares the password to comparison data to authenticate the password. In other words, the password is protected via hashing. In Example 3, the password is protected via a different method. In Example 3, descriptions of points shared with Example 1 and Example 2 are omitted.

Figure 8:
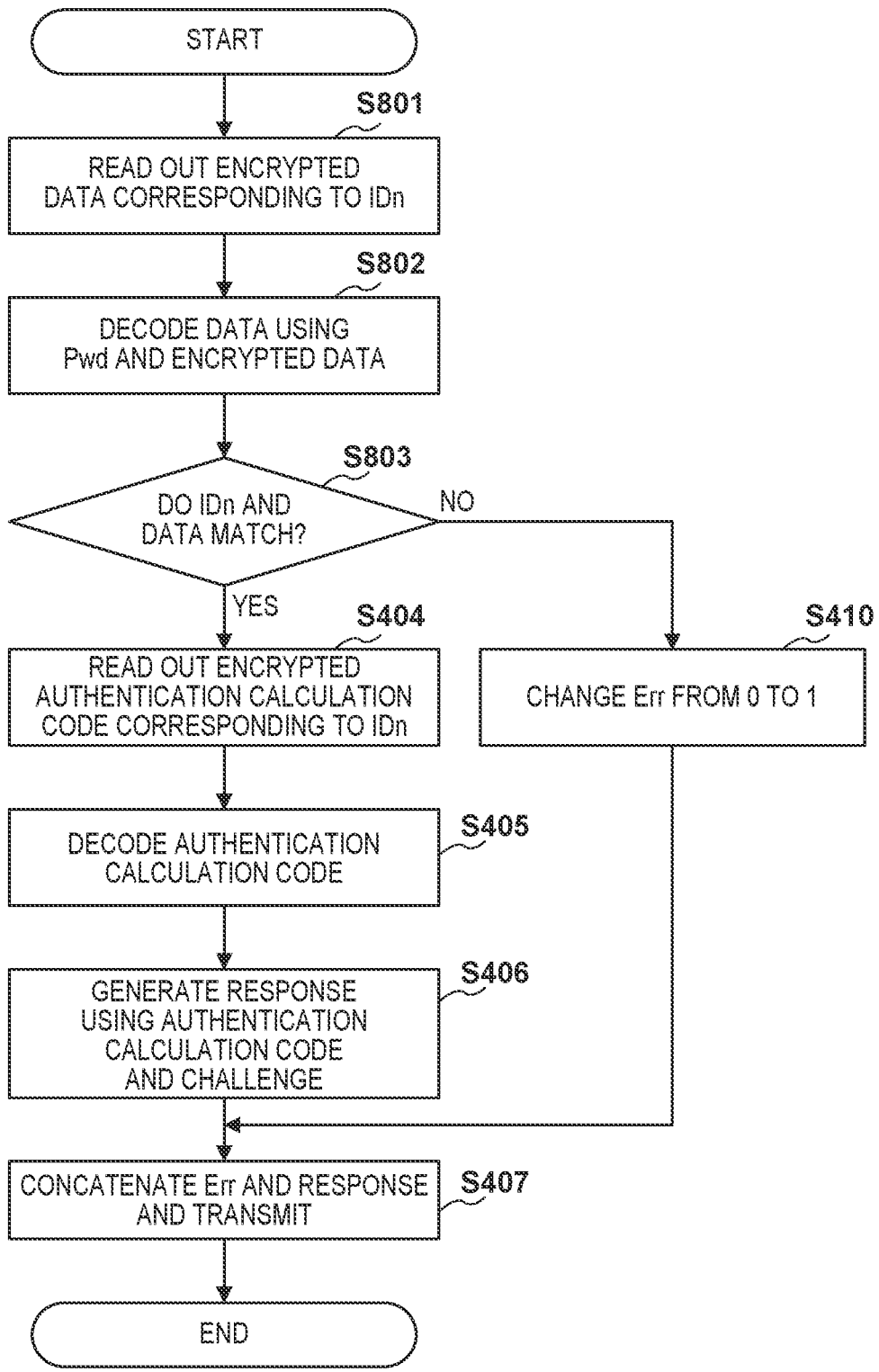
FIG. 8 is a flowchart illustrating the processing of response generation.

FIG. 8 illustrates the processing of Example 3. Compared to FIG. 4, step S401, step S402, and step S403 are substituted with step S801, step S802, and step S803, respectively. Step S401, step S402, and step S403 illustrated in FIG. 6 may also be substituted with step S801, step S802, step S803, respectively.

In step S801, the microcomputer 202b reads out an encrypted Encdata(IDn) corresponding to the identification information IDn from the non-volatile memory 205b. The encrypted Encdata(IDn) is 16-byte data.

In step S802, the microcomputer 202b decodes the data using the password Pwd received from the authentication chip 106 and the encrypted Encdata(IDn). The password Pwd is substituted in Formula (14) as the decoding key.

$$\text{Decdata} = \text{Dec}(\text{Pwd}, \text{Encdata}(IDn)) = \text{AES\_Dec}((\text{Pwd}, \text{Encdata}(IDn)) \qquad (14)$$

Here, AES_Dec is a decoding function using AES specified in NIST_FIPS_PUB 197. The password Pwd is used as the decoding key, and the encrypted Encdata(IDn) is used as the input data.

In step S803, the microcomputer 202b determines whether or not the decoded data Decdata and the identification information IDn match. In a case where they match, the microcomputer 202b proceeds the processing to step S404. In a case where they do not match, the microcomputer 202b proceeds the processing to step S410.

The Encdata(IDn) stored in the non-volatile memory 205b is generated in advance so that the Decdata obtained using Formula (14) matches the identification information IDn. In other words, Encdata(IDn) is obtained by AES encrypting (in other words, encrypting using the AES_Dec inverse function) the identification information IDn with the password Pwd. In a case where the received password Pwd is correct, Encdata (IDn) is correctly decoded. In this manner, the encrypted data Encdata(IDn) stored in the non-volatile memory 205b is data generated by encrypting the identification information IDn with the password Pwd. In a case where the encrypted data Encdata(IDn) is exposed for some reason, Decdata remains unknown. Unless the password Pwd is obtained, Decdata is safe. Thus, in Example 3, a secure password authentication can be achieved as in Example 1.

FIG. 9 illustrates a memory data map stored in the non-volatile memory 205b according to Example 3. Instead of the hashed password Hpass'(IDn) of Example 1 illustrated in FIG. 5, the encrypted data Encdata(IDn) is stored.

Formula (14) uses an AES decoding function. The encrypting function and the decoding function are dualistic and can be transformed in the reverse direction. Accordingly, the decoding function may be substituted with the encrypting function.

Example 4

Figure 10:
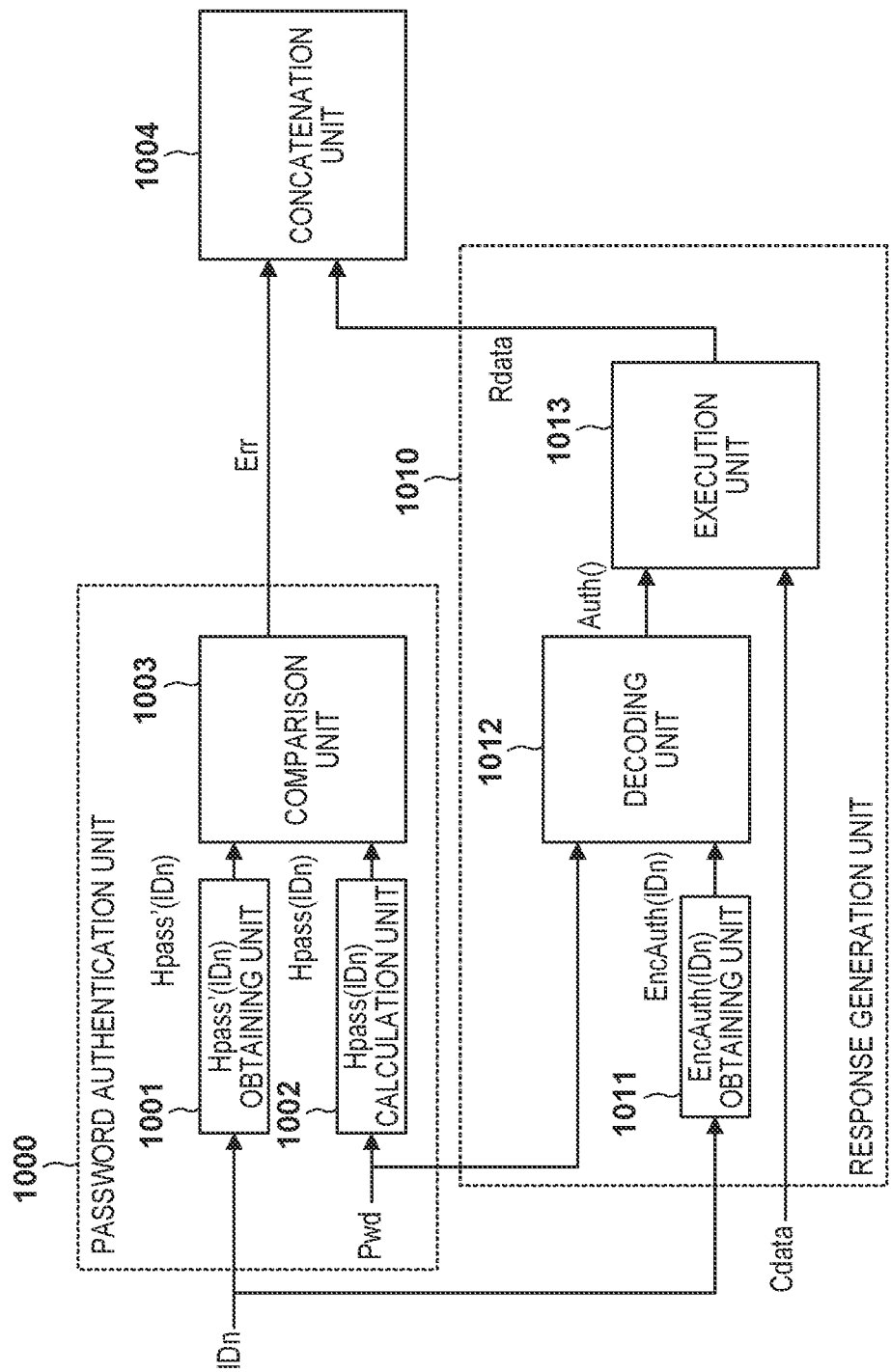
FIG. 10 is a diagram for describing functions of a microcomputer.

FIG. 10 illustrates functions implemented by a CPU installed in the microcomputer 202b of Example 1. The CPU is an example of the processor circuit. One or more or all of the functions illustrated in FIG. 10 may be implemented by a hardware circuit, such as ASIC or FPGA. ASIC stands for an application-specific integrated circuit. FPGA stands for a field-programmable gate array.

A password authentication unit 1000 executes password authentication by reading out comparison information corresponding to the identification information IDn and comparing the hashed password and the comparison information. Specifically, an obtaining unit 1001 obtains Hpass'(IDn), i.e., the comparison information corresponding to the identification information IDn, from the non-volatile memory 205b and inputs Hpass'(IDn) into a comparison unit 1003. A calculation unit 1002 generates Hpass(IDn), i.e., a password H(Pwd) hashed based on the password Pwd, and inputs Hpass(IDn) into the comparison unit 1003. H( ) is a hash function. The comparison unit 1003 compares Hpass' (IDn) and Hpass(IDn) and executes password authentication. Then the error bit Err, i.e., the execution result, is passed to a concatenation unit 1004.

A response generation unit 1010 generates the response Rdata on the basis of the challenge Cdata in a case where the password authentication unit 1000 determines that password authentication is successful. An obtaining unit 1011 obtains the encrypted authentication calculation code EncAuth( ) corresponding to the identification information IDn from the non-volatile memory 205b and passes the encrypted authentication calculation code EncAuth( ) to a decoding unit 1012. The decoding unit 1012 decodes the authentication calculation code Auth( ) from the encrypted authentication calculation code EncAuth( ) using the password Pwd and passes the authentication calculation code Auth( ) to an execution unit 1013. The execution unit 1013 sets the challenge Cdata as an argument in the authentication calculation code EncAuth( ) and executes the authentication calculation code EncAuth( ). In this manner, the response Rdata is generated. The execution unit 1013 passes the response Rdata to the concatenation unit 1004. The concatenation unit 1004 concatenates the error bit Err and the response Rdata, generates the response data, and outputs the response data to the output circuit of the input/output circuit 201b. The output circuit of the input/output circuit 201b transmits the response data.

Figure 11:
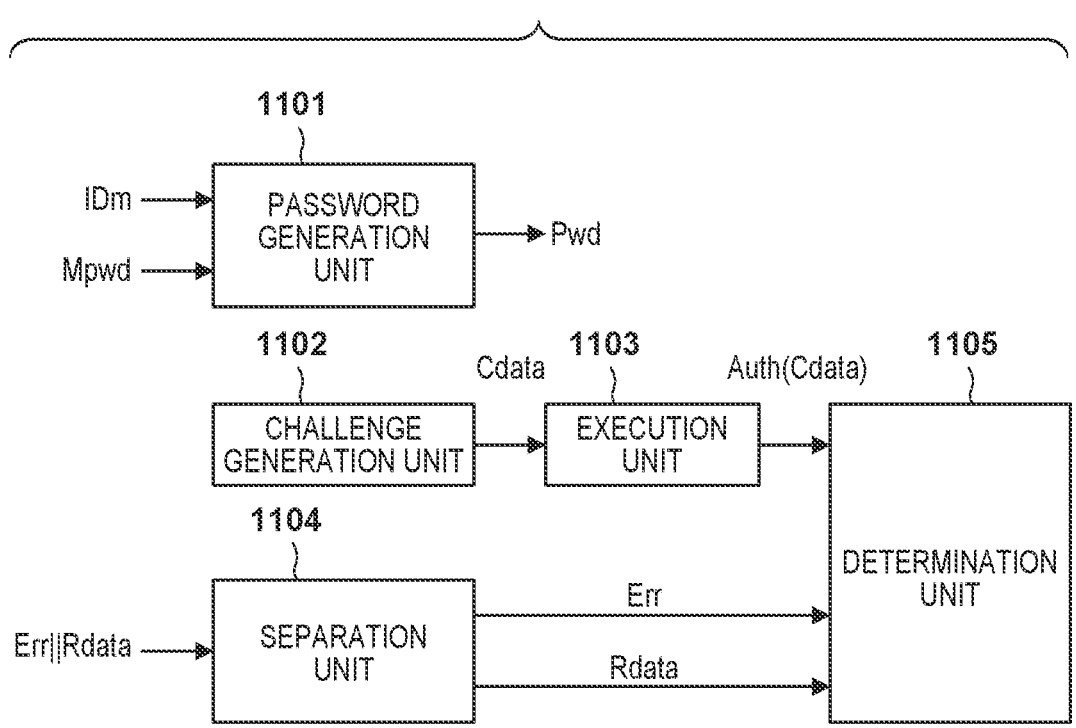
FIG. 11 is a diagram for describing functions of a microcomputer.

FIG. 11 illustrates functions implemented by a CPU installed in the microcontroller 202a of the authentication chip 106. The CPU is an example of the processor circuit. One or more or all of the functions illustrated in FIG. 11 may be implemented by a hardware circuit, such as ASIC or FPGA.

A password generation unit 1101 generates the password Pwd based on the identification information IDm of the authentication-target chip 103 and the master password obtained from the non-volatile memory 205a. A challenge generation unit 1102 has a built-in random number generator and generates the challenge Cdata using the random number generator. The challenge generation unit 1102 transmits the challenge Cdata via the output circuit of the input/output circuit 201a. Also, the challenge generation unit 1102 passes the challenge Cdata to the execution unit 1103 via the non-volatile memory 205a. The execution unit 1103 sets Cdata as an argument in the authentication calculation code Auth( ), executes the authentication calculation code Auth( ), generates authentication data Auth(Cdata), and passes the authentication data Auth(Cdata) to a determination unit 1105.

A separation unit 1104 separates Err||Rdata, i.e., the response data received via the input circuit of the input/output circuit 201a into the error bit Err and the response Rdata. The determination unit 1105 authenticates the authentication-target chip 103 by comparing the authentication data Auth(Cdata) and the response Rdata. In a case where the error bit Err is 1 or the authentication data Auth(Cdata) and the response Rdata do not match, the determination unit 1105 determines that authentication is unsuccessful. In a case where the error bit Err is 0 and the authentication data Auth(Cdata) and the response Rdata match, the determination unit 1105 determines that authentication is successful.

Figure 12:
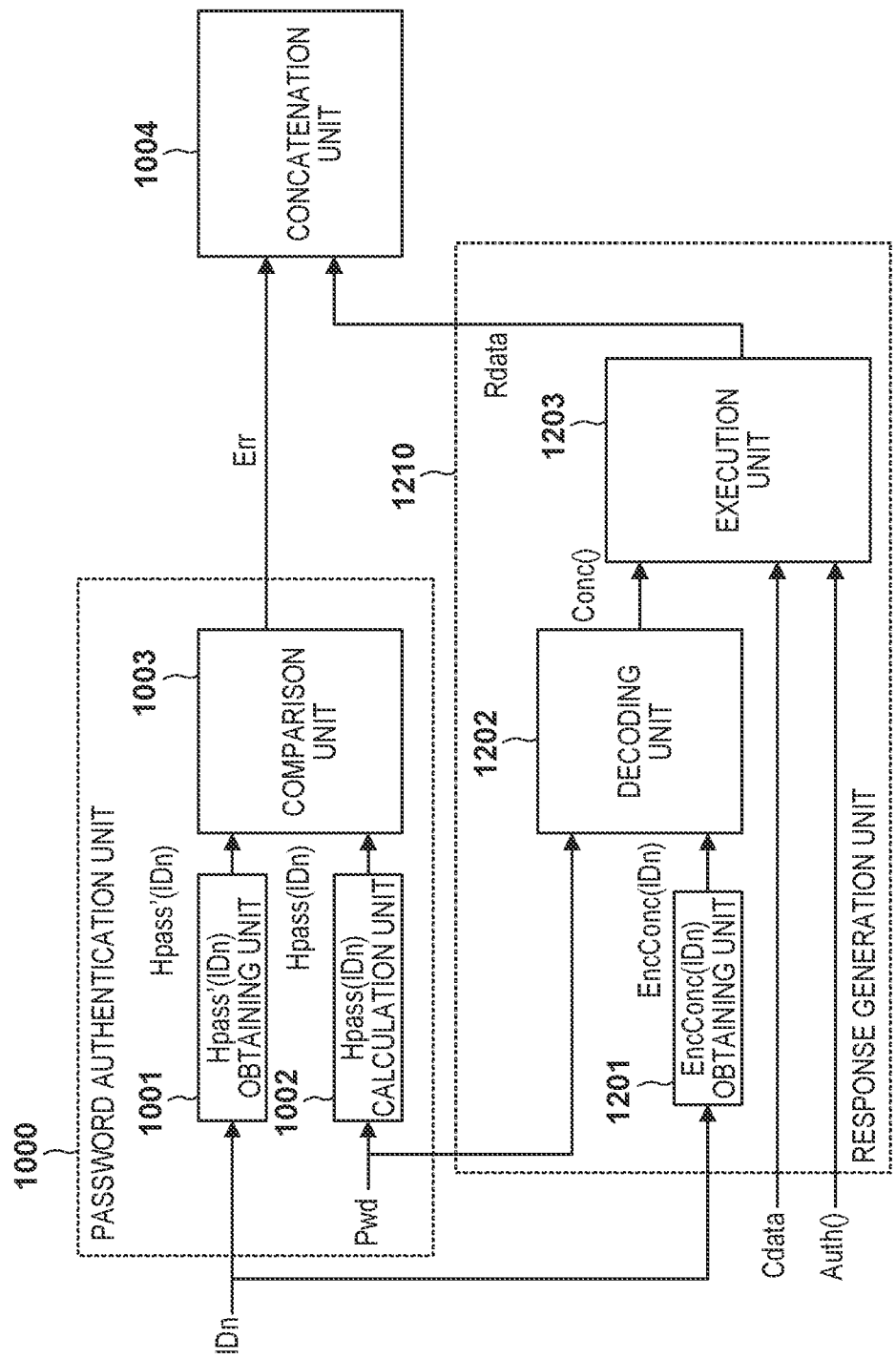
FIG. 12 is a diagram for describing functions of a microcomputer.

FIG. 12 illustrates functions implemented by a CPU installed in the microcomputer 202b of Example 2. The password authentication unit 1000 is unchanged, and so the description thereof is omitted. In FIG. 12, the response generation unit 1010 is substituted with a response generation unit 1210. The response generation unit 1210 has the functions described below.

An obtaining unit 1201 obtains an encrypted join calculation code EncConc( ) corresponding to the identification information IDn from the non-volatile memory 205b and passes the encrypted authentication calculation code EncAuth( ) to a decoding unit 1202. The decoding unit 1202 decodes the join calculation code Conc( ) from the encrypted join calculation code EncConc( ) using the password Pwd and passes the join calculation code Conc( ) to an execution unit 1203. The decoding algorithm of the decoding unit 1202 is the same as that described in Example 2.

The execution unit 1203, as preprocessing, executes the join calculation code Conc( ) with the challenge Cdata set as an argument and generates Conc(Cdata). The execution unit 1203 executes the authentication calculation code Auth( ) with Conc(Cdata) generated by preprocessing set as an argument and generates the response Rdata. The execution unit 1203 obtains the authentication calculation code Auth( ) from the non-volatile memory 205b.

Figure 13:
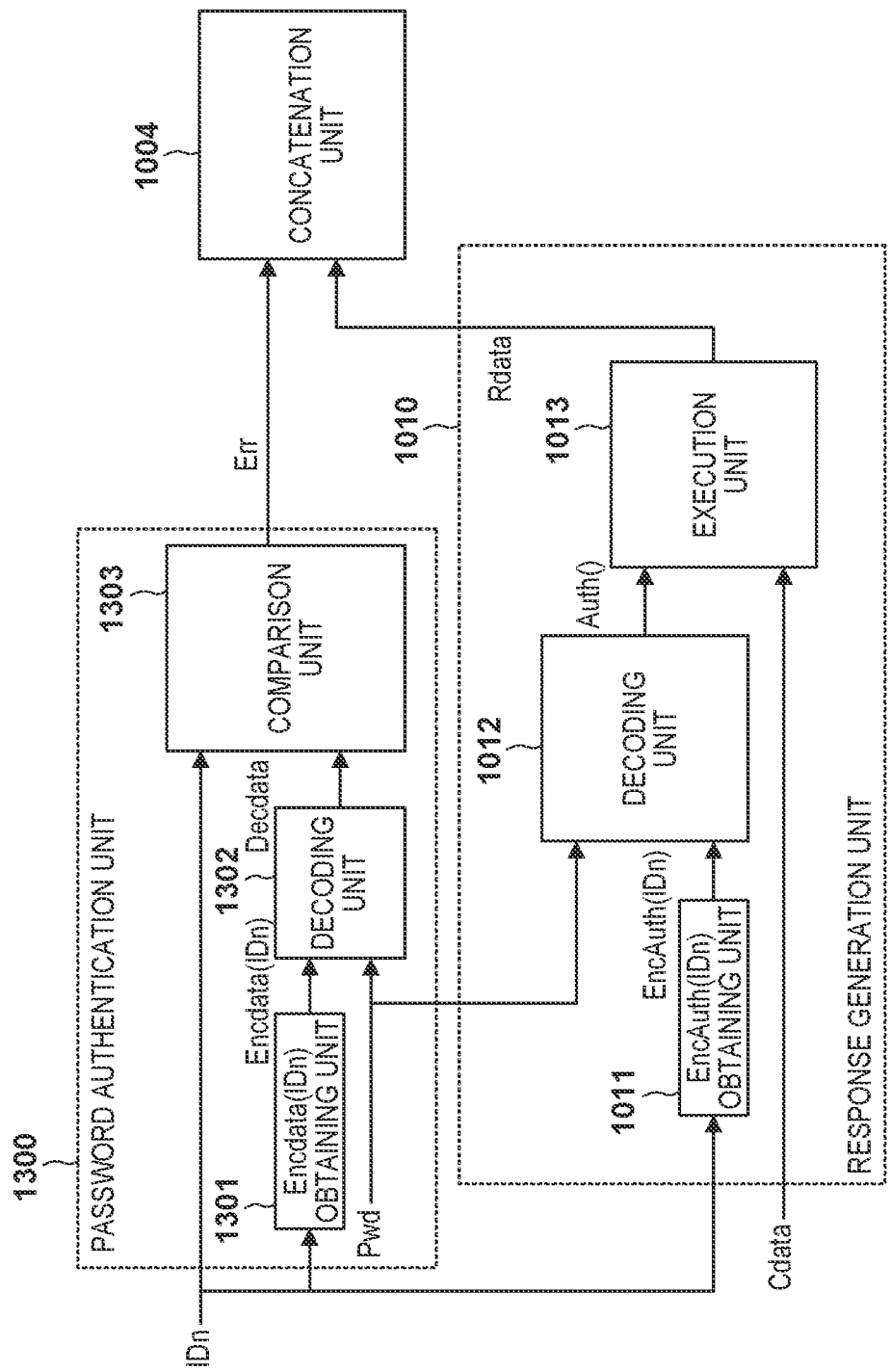
FIG. 13 is a diagram for describing functions of a microcomputer.

FIG. 13 illustrates functions implemented by a CPU installed in the microcomputer 202b of Example 3. The password authentication unit 1000 is substituted with a password authentication unit 1300. In FIG. 13, the response generation unit 1010 is unchanged. However, the response generation unit 1010 may be substituted with the response generation unit 1210.

As illustrated in FIG. 13, an obtaining unit 1301 obtains Encdata(IDn), which is encrypted data corresponding to the identification information IDn, from the non-volatile memory 205b and passes Encdata(IDn) to a decoding unit 1302. The decoding unit 1302 decodes plaintext data Decdata(IDn) from Encdata(IDn) using the password Pwd as the decoding key and passes Decdata(IDn) to a comparison unit 1303. The comparison unit 1303 determines whether or not the identification information IDn and the plaintext data Decdata(IDn) match. The comparison unit 1303 outputs the error bit Err indicating the determination result to the concatenation unit 1004.

Technical Ideas Derived from Examples

Perspectives 1, 20, 21

The input circuit provided in the input/output circuit 201b functions as a reception unit that receives the identification information, the password, and the challenge from the authentication apparatus. The microcomputer 202b and the calculation unit 1002 function as a hash calculation unit that hashes the password. The microcomputer 202b and the comparison unit 1003 function as a password authentication unit that executes password authentication by reading out comparison information corresponding to the identification information and comparing the hashed password and the comparison information. The microcomputer 202b and the response generation unit 1010 function as a generation unit that generates a response based on the challenge in a case where password authentication is successful. The output circuit provided in the input/output circuit 201b functions as a transmission unit that transmits the response to the authentication apparatus.

The microcomputer 202b (the response generation unit 1010) obtains an encrypted authentication calculation code, which is a stored program code corresponding to the identification information. The microcomputer 202b (the response generation unit 1010) decodes an executable authentication calculation code from the encrypted authentication calculation code using the password successful in password authentication. Furthermore, the microcomputer 202b (response generation unit 1010) generates a response by executing the authentication calculation code by applying the challenge to the authentication calculation code. Compared to the related art, this makes replication of the authentication-target apparatus more difficult.

Note that each unit may be implemented by the processor circuit executing a program, implemented by an electrical circuit, or implemented by a combination thereof. In this manner, each unit may be substituted with a circuit or program module. One or more of the units of the plurality of units may be implemented by an electrical circuit and the remaining units may be implemented by a processor and a program module.

Perspective 2

As illustrated in FIG. 5, the non-volatile memory 205b functions as a storage unit that stores a plurality of sets, each set including the identification information allocated to the authentication apparatus, the comparison information generated by hashing the password in advance, and the encrypted authentication calculation code. The password authentication unit (for example, the password authentication unit 1000) may be configured to read out from the storage unit the comparison information corresponding to the identification information received from the authentication apparatus. The response generation unit 1010 may be configured to read out from the storage unit the encrypted authentication calculation code corresponding to the identification information received from the authentication apparatus.

Perspective 3

The response generation unit 1010 may decode the authentication calculation code using a decoding function (for example, Dec( )) that outputs the authentication calculation code using the password and the encrypted authentication calculation code as input. In this manner, a program code executable by a processor may be decoded.

Perspectives 4, 5

The decoding function, for example, may be a function (for example, CBC_AES_Dec( )) that executes a common key cryptographic algorithm (for example, AES or the like) with the password as the common key. The decoding function may be a function that executes a block encryption with the common key cryptographic algorithm as a primitive function. Examples of such block encryption methods include a cipher block chaining mode (CBC mode), a cipher feedback mode (CFB mode), an output feedback mode (COB mode), and a counter mode (CTR mode), for example. Also, the decoding function may be a function that generates the authentication calculation code by obtaining the exclusive or of a data string obtained by repeatedly calculating the cryptographic hash function using a concatenated password and counter and the encrypted authentication calculation code. This example is represented by Formula (8).

Perspective 7, 8

As represented in Formula (5) and Formula (6), the authentication calculation code may be a program code programmed to generate a response by applying the challenge to the key held in advance. Also, the authentication calculation code may convert the challenge into a response using an algorithm that generates a message authentication code (CMAC) based on a cipher. Also, the authentication calculation code may convert the challenge into a response using an algorithm a generates a message authentication code (HMAC) based on the hash function.

Perspectives 9, 10

The transmission unit (for example, the output circuit of the input/output circuit 201b) may be configured to transmit the identification information allocated to the authentication-target apparatus to the authentication apparatus. As represented by Formula (1), the password received from the authentication apparatus may be a password obtained on the basis of the identification information allocated to the authentication-target apparatus and the master password held by the authentication apparatus. For example, the password received from the authentication apparatus may be a password obtained by inputting the data string obtained by concatenating the identification information allocated to the authentication-target apparatus and the master password held by the authentication apparatus into the cryptographic hash function.

Perspective 11

The microcomputer 202b (response generation unit 1210) may generate the response by executing the authentication calculation code by applying the challenge to the authentication calculation code, which is an executable program code, in a case where password authentication is successful. The response generation unit 1210 obtains an encrypted preprocessing calculation code (for example. EncConc( )), which is a stored program code corresponding to the identification information. The preprocessing calculation code is a program code that executes preprocessing on the challenge and passes the preprocessed challenge to the authentication calculation code. The response generation unit 1210 decodes the executable preprocessing calculation code (for example, Conc( )) from the encrypted preprocessing calculation code using the password successful in password authentication. The response generation unit 1210 generates the preprocessing data (for example, Conc(Cdata)) by executing the preprocessing calculation code by applying the challenge to the preprocessing calculation code. The response generation unit 1210 generates the response by executing the authentication calculation code by applying the preprocessing data to the authentication calculation code. In this manner, it is not necessary to encrypt the entire authentication calculation code, and the preprocessing calculation code (the join calculation code) corresponding to a part of the authentication calculation code may be encrypted. Compared to the related art, this makes replication of the authentication-target apparatus more difficult.

Perspective 12

As illustrated in FIG. 7, the non-volatile memory 205b is an example of a storage unit that stores a plurality of sets, each set including the identification information allocated to the authentication apparatus, the comparison information generated by hashing the password in advance, and the preprocessing calculation code. The response generation unit 1210 may be configured to read out from the storage unit the encrypted preprocessing calculation code corresponding to the identification information received from the authentication apparatus.

Perspective 13

The response generation unit 1210 may decode the preprocessing calculation code using a decoding function that outputs the preprocessing calculation code using the password and the encrypted preprocessing calculation code as input.

Perspective 14

As described in Example 2, the preprocessing calculation code may be a program code that concatenates a key held in advance and the challenge. The preprocessing calculation code may be a program code that calculates the exclusive or of the key held in advance and the challenge. The preprocessing calculation code may be a program code that concatenates the exclusive or of a part of the key held in advance and a part of the challenge and the exclusive or of the remaining part of the key held in advance and the remaining part of the challenge.

Perspective 15

As described in Example 3, the microcomputer 202b (password authentication unit 1300) functions as a decoding unit that reads out the encrypted data corresponding to the identification information and decodes plaintext data from the encrypted data by applying the password to the encrypted data as a decoding key. The comparison unit 1303 of the password authentication unit 1300 functions as a password authentication unit that executes password authentication by comparing the plaintext data and the identification information.

Perspective 16

As illustrated in FIG. 9, the non-volatile memory 205b is an example of a storage unit that stores a plurality of sets, each set including the identification information allocated to the authentication apparatus, the encrypted data, and the encrypted authentication calculation code. The decoding unit (for example, the obtaining unit 1301) may be configured to read out from the storage unit the encrypted data corresponding to the identification information received from the authentication apparatus. The response generation unit 1010 may be configured to read out from the storage unit the encrypted preprocessing calculation code corresponding to the identification information received from the authentication apparatus.

Perspective 17

The decoding unit 1302 may decode the plaintext data using a decoding function with the password and the encrypted data as input and the plaintext data as output.

Perspective 18

In FIG. 13, the password authentication unit 1300 and the response generation unit 1010 are combined. However, the password authentication unit 1300 may be combined with the response generation unit 1210 illustrated in FIG. 12.

Perspective 19

The authentication apparatus may be the image forming apparatus 100. The authentication-target apparatus may be a replaceable component or a consumable component detachable from the image forming apparatus 100 (for example, the process cartridge 102).

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-038119, filed Mar. 5, 2020 which is hereby incorporated by reference herein in its entirety.

What is claimed is:

1. An authentication-target apparatus comprising:
at least one processor; and
at least one memory storing instructions that, when executed by the at least one processor, cause the authentication-target apparatus to function as:
  a reception unit configured to receive identification information, a password, and a challenge from an authentication apparatus;
  a hash calculation unit configured to hash the password;
  a password authentication unit configured to execute password authentication by reading out comparison information corresponding to the identification information and comparing the hashed password and the comparison information;
  a generation unit configured to generate a response based on the challenge in a case where the password authentication is successful; and
  a transmission unit configured to transmit the response to the authentication apparatus,
wherein the generation unit is further configured to
obtain an encrypted authentication calculation code, which is a stored program code corresponding to the identification information,
decode an executable authentication calculation code from the encrypted authentication calculation code using the password successful in the password authentication, and
generate the response by executing the authentication calculation code by applying the challenge to the authentication calculation code.

2. The authentication-target apparatus according to claim 1, wherein the at least one memory also functions as a storage unit configured to store a plurality of sets, each set including identification information allocated to the authentication apparatus, comparison information generated by hashing a password in advance, and the encrypted authentication calculation code,
wherein the password authentication unit is configured to read out from the storage unit comparison information corresponding to the identification information received from the authentication apparatus; and
the generation unit is configured to read out from the storage unit the encrypted authentication calculation code corresponding to the identification information received from the authentication apparatus.

3. The authentication-target apparatus according to claim 1, wherein
the generation unit decodes the authentication calculation code using a decoding function that outputs the authentication calculation code using the password and the encrypted authentication calculation code as input.

4. The authentication-target apparatus according to claim 3, wherein
the decoding function is a function that executes a common key cryptographic algorithm using the password as a common key.

5. The authentication-target apparatus according to claim 3, wherein
the decoding function is a function that generates the authentication calculation code by obtaining exclusive or of a data string obtained by repeatedly calculating a cryptographic hash function using a concatenated the password and counter and the encrypted authentication calculation code.

6. The authentication-target apparatus according to claim 4, wherein
the decoding function is a function that executes block encryption based on a cipher block chaining mode, a cipher feedback mode, an output feedback mode, or a counter mode using the common key cryptographic algorithm as a primitive function.

7. The authentication-target apparatus according to claim 1, wherein
the authentication calculation code is a program code that generates the response by applying the challenge to a key held in advance.

8. The authentication-target apparatus according to claim 7, wherein
the authentication calculation code converts the challenge into the response using an algorithm that generates a message authentication code based on a cipher (CMAC) or an algorithm that generates a message authentication code based on a hash function (HMAC).

9. The authentication-target apparatus according to claim 1, wherein
the transmission unit is configured to transmit to the authentication apparatus identification information allocated to the authentication-target apparatus; and
a password received from the authentication apparatus is a password obtained on the basis of the identification information allocated to the authentication-target apparatus and a master password held by the authentication apparatus.

10. The authentication-target apparatus according to claim 9, wherein
the password received from the authentication apparatus is a password obtained by inputting a data string obtained by concatenating the identification information allocated to the authentication-target apparatus and the master password held by the authentication apparatus into a cryptographic hash function.

11. The authentication-target apparatus according to claim 1, wherein
the authentication apparatus is an image forming apparatus, and the authentication-target apparatus is a replaceable component or a consumable component detachable from the image forming apparatus.

12. An authentication system comprising an authentication apparatus and an authentication-target apparatus, wherein
the authentication apparatus is configured to transmit to the authentication-target apparatus identification information, a password, and a challenge allocated to the authentication apparatus, receive a response corresponding to the challenge from the authentication-target apparatus, and authenticate the authentication-target apparatus using the response; and
the authentication-target apparatus includes
at least one processor; and
at least one memory storing instructions that, when executed by the at least one processor, cause the authentication-target apparatus to function as:
a reception unit configured to receive identification information, a password, and a challenge from the authentication apparatus;
a hash calculation unit configured to hash the password;
a password authentication unit configured to execute password authentication by reading out comparison information corresponding to the identification information and comparing the hashed password and the comparison information;
a generation unit configured to generate a response based on the challenge in a case where the password authentication is successful; and
a transmission unit configured to transmit the response to the authentication apparatus,
wherein the generation unit
obtains an encrypted authentication calculation code, which is a stored program code corresponding to the identification information, decodes an executable authentication calculation code from the encrypted authentication calculation code using the password successful in the password authentication, and generates the response by executing the authentication calculation code by applying the challenge to the authentication calculation code.

13. An authentication method comprising:
transmitting via an authentication apparatus identification information, a password, and a challenge of the authentication apparatus to an authentication-target apparatus;
receiving via the authentication-target apparatus the identification information, the password, and the challenge from the authentication apparatus;
hashing the password via the authentication-target apparatus;
executing via the authentication-target apparatus password authentication by reading out comparison information corresponding to the identification information and comparing the hashed password and the comparison information;
obtaining via the authentication-target apparatus an encrypted authentication calculation code, which is a stored program code corresponding to the identification information, in a case where the password authentication is successful;
decoding via the authentication-target apparatus an executable authentication calculation code from the encrypted authentication calculation code using the password successful in the password authentication;
generating via the authentication-target apparatus a response by executing the authentication calculation code by applying the challenge to the authentication calculation code;

transmitting the response to the authentication apparatus via the authentication-target apparatus;
receiving the response via the authentication apparatus; and
authenticating the authentication-target apparatus using the response via the authentication apparatus.

* * * * *